United States Patent [19]

Guest

[11] Patent Number: 4,573,716

[45] Date of Patent: Mar. 4, 1986

[54] TUBE COUPLINGS

[76] Inventor: John D. Guest, "Iona", Cannon Hill Way, Bray, Maidenhead, Berkshire, United Kingdom

[21] Appl. No.: 559,507

[22] Filed: Dec. 8, 1983

[30] Foreign Application Priority Data

Dec. 13, 1982 [GB] United Kingdom ............... 8235475

[51] Int. Cl.⁴ ............................................. F16L 21/06
[52] U.S. Cl. ...................................... 285/323; 285/45; 285/307; 285/DIG. 22
[58] Field of Search ................ 285/323, 322, 307, 45, 285/DIG. 22

[56] References Cited

U.S. PATENT DOCUMENTS

| 2,159,150 | 5/1939 | Heintz | 285/322 X |
| 3,645,547 | 2/1972 | Glover | 285/DIG. 22 X |
| 3,653,689 | 4/1972 | Sapy et al. | 285/322 X |
| 4,005,883 | 2/1977 | Guest | 285/369 X |
| 4,178,023 | 12/1979 | Guest | 285/323 |
| 4,304,426 | 12/1981 | Francis | 285/323 |

FOREIGN PATENT DOCUMENTS

| 21795 | 1/1981 | European Pat. Off. | 285/323 |
| 710589 | 9/1941 | Fed. Rep. of Germany | 285/DIG. 22 |
| 1303139 | 7/1962 | France | 285/45 |
| 1602077 | 11/1981 | United Kingdom | 285/322 |

Primary Examiner—Richard J. Scanlan, Jr.
Attorney, Agent, or Firm—Beveridge, DeGrandi & Weilacher

[57] ABSTRACT

In a tube coupling of the kind having a collet for gripping a tube within a body member, the collet having arms co-operating with a tapered bore in the body member so that a pull on the tube pulls the collet outwardly and so causes the collet arms to grip the tube more firmly, and wherein the tube can be released from the coupling by axial inward pressure on a head on the collet, accidental release of the tube is prevented by an end cover through which the tube passes and which surrounds the collet head, the end cover resiliently engaging in the body member.

10 Claims, 3 Drawing Figures

TUBE COUPLINGS

BACKGROUND OF THE INVENTION

1. Field of the Invention

This invention relates to quick release tube couplings of the kind having a body portion with a bore containing an axially tapered portion co-operating with arms of a collet extending into the bore for gripping a tube inserted into the coupling, the tapered portion being such that axially outward movement of the collet arms engaging the tapered portion of the bore in the coupling body causes the collet arms to be pressed inwardly to grip a tube in the bore. Hence a pull on the tube causes the collet arms to be pressed into tighter engagement with the tube.

2. Prior Art

A tube may be released from such a coupling by pressing or holding the collet axially inwardly of the coupling body whilst the tube is withdrawn. For this purpose the collet may be arranged to extend axially outwardly of the coupling body and, as described in U.S. Pat. No. 4,005,883, may have a head, e.g. a radially extending flange, on this outward portion of the collet to facilitate the application of axial pressure to release a tube.

SUMMARY OF THE INVENTION

According to the present invention, in a tube coupling having a body part with a bore containing an axially tapered portion co-operating with arms of a collet extending into the bore, the tapered portion being such that axially outward movement of the collet arms engaging the tapered section causes the collet arms to be pressed inwardly to grip a tube in the bore, there is provided an end cover extending around the axially outer end of the collet and adapted to engage resiliently a part of the coupling body, the end cover having an apertured portion through which a tube can extend into the collet, said end cover and coupling body having mutually engaging portions limiting axially inward movement of the end cover so as to prevent the collet being pressed inwardly to release a tube by pressure on the end cover, and the end cover and coupling body being shaped so that the end cover can be disengaged from the body by an axially outward pull.

By this arrangement, a tube, before being inserted into the coupling, can be passed through the aperture in the end cover and then inserted in the coupling in the usual way. The coupling can then be resiliently engaged with the coupling body so that the collet is protected from accidental release. It is readily possible however to release a tube when required merely by moving the cover axially outwardly and then pressing the collet inwardly. The cover may readily be arranged to fit closely around the tube and be formed to protect the coupling against dirt entering under the head of the collet and making release difficult.

The aperture in the end cover may be shaped to have a peripheral surface in the axial direction to facilitate passage of a tube through the aperture. In some cases it may be preferred to form a flexible lip on the periphery of this aperture to seal against a tube inserted through the end cover.

DESCRIPTION OF THE PREFERRED EMBODIMENTS

Figure 1:
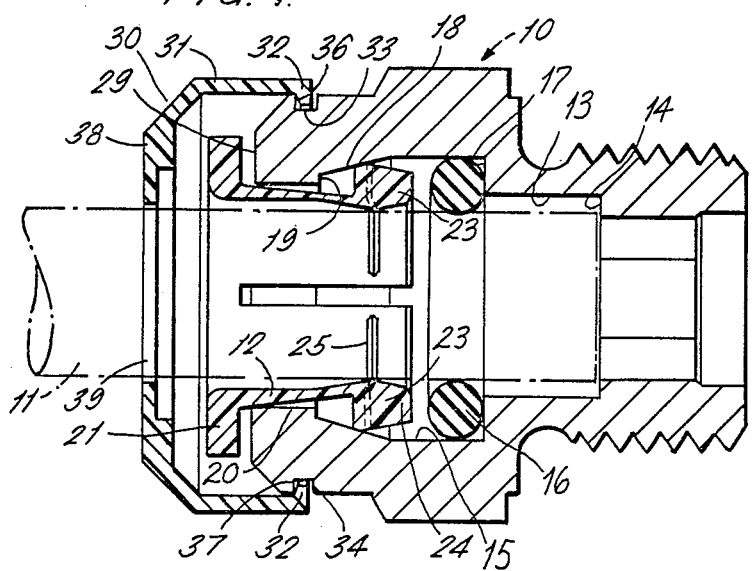
FIG. 1 is a longitudinal section through a coupling with an end cover and constituting one embodiment of the invention.

Referring to FIG. 1 there is shown a coupling body 10 for effecting a coupling to a tube 11 using a collet 12. A bore 13 extends through the coupling body and has a shoulder 14 forming an end stop for the tube 11 when inserted in the coupling. An enlarged diameter portion 15 of the bore contains an O-ring or other similar seal 16 which abuts against a shoulder 17 in the coupling body and which, in use, seals against the external surface of the tube 11 and against the internal wall surface of the bore in the coupling. The enlarged diameter portion 15, towards the end from which the tube 11 is inserted, has a tapered portion 18 tapering to a narrower diameter in the axially outward direction, this taper being terminated by an inwardly facing shoulder 19 between the tapered portion 18 and a narrower diameter portion 20. Within this part of the coupling body is the collet 12 which is formed with a ring portion 21 lying outside the coupling body which ring portion is formed integrally with a plurality of collet arms, typically four arms 23, formed of resilient material and extending in the axial direction. These arms, in section, are of generally arcuate shape to embrace the tube 11. Towards their axially inner ends, these collet arms are formed with a head portion 24 having a tooth element 25 extending radially inwardly to abut against and bite into the tube to be gripped. Conveniently the collet is formed of plastics material with the tooth element constituted by a metal insert embedded in the plastics material of the collet. The head portions 24 on the ends of the collet arms 23 are forced slightly outwardly against the resilience of the arms when a tube 11 is inserted in the coupling body. These arms will thus engage against the tapered portion 18 of the bore in the coupling body when a tube is inserted into the collet and, if the collet is then moved axially outwardly, that is to say to the left in FIG. 1, this engagement with the tapered portion 18 of the coupling body 10 causes the collet 12 to grip the tube more tightly as the tube and collet are pulled outwardly.

A coupling as thus far described is known. To release a tube from the coupling, the collet 12 is pressed axially inwardly, that is to say to the right in FIG. 1, so that the collet arms can move radially outwardly releasing the grip on the tube. In order to prevent accidental release of a tube, it has been a practice to put a ring, e.g. a spring clip, around the collet between the outwardly extending head portion 21 and the end face 29 of the body. Such a locking ring has to be accurately dimensioned and, if the coupling is to be used for quickly releasing a tube, provision must be made for easy removal of the locking ring. The present invention is concerned more particularly with another method of preventing accidental release of the collet. In the embodiment shown in FIG. 1, this is achieved by the provision of an end cover 30 comprising a cylindrical portion 31 having an inwardly extending lip 32. The end cover is formed of a resilient plastics material and the lip 32 can resiliently engage in an annular groove 33 in the coupling body. The lip 32 abuts against one side wall 34 of this groove which thereby forms a stop preventing axial movement of the cover towards the right in FIG. 1. The cover may be removed however by pulling it to the left. Movement in this direction is facilitated by the provision of a sloping face 36 on the lip 32 which face engages the radially outward extremity of the left-hand wall 37 of the groove in the coupling body. The cylindrical portion 31 of the end cover is formed integrally with an end portion 38 having a central aperture 39 through which the tube 11 passes, the cover closely fitting around the tube.

Figure 2:
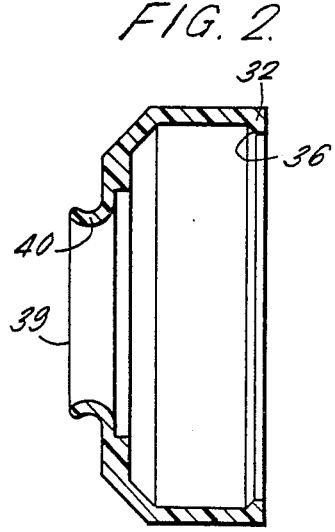
FIGS. 2 and 3 are sections through two further forms of end cover which may be used with the coupling of FIG. 1.

FIG. 2 illustrates a modified form of end cover in which a flexible lip 40 is formed around the periphery of the aforementioned aperture 39 so as to bear resiliently against and seal around the tube when a tube is inserted through the aperture.

Figure 3:
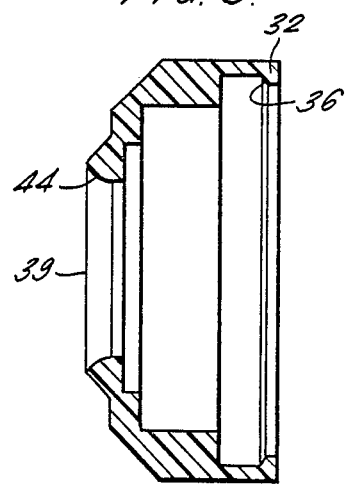

FIG. 3 illustrates another form of end cover where a rounded entry portion 44 is formed around the periphery of the aperture 39 through which the tube passes. The cover of FIG. 3 may for example be used with a tube of plastics material which will deform slightly and seal against the periphery of the aperture, the rounded entry portion 44 facilitating insertion of the tube through the aperture.

I claim:

1. A tube coupling comprising a collet to receive a tube to be held therein;
    a body part having an end from which a bore extends through the body part, the bore having an axially tapered portion to cooperate with arms of said collet extending into the bore, the tapered portion of the bore being such that movement of the collet arms engaging the tapered portion axially outwardly of the bore causes the collet arms to be pressed inwardly to grip a tube in the collet;
    a resilient end cover enclosing said end of the body and part of the collet projecting from said end of the bore and adapted to engage resiliently a part of the coupling body;
    an apertured portion in the end cover through which a tube can extend into the collet;
    abutment means on the body part facing towards said end of the body part into which the bore extends and with which the end cover is engageable to hold said apertured portion of the end cover spaced apart from the axially outer end of the collet such that accidental impact on the cover is absorbed by the cover and is not transmitted to the collet to avoid accidental relase of the tube;
    wherein the end cover and coupling body are shaped so that the end cover can be disengaged from the body by an axially outward pull to reveal the end of the collet when it is required to release the collet.

2. A tube coupling as claimed in claim 1 and for use with a tube of predetermined outside diameter wherein the cover is arranged to fit closely around the tube.

3. A tube coupling as claimed in claim 2 wherein the aperture in the end cover is shaped to have a peripheral surface rounded in the axial direction to facilitate passage of a tube through the aperture.

4. A tube coupling as claimed in claim 2 wherein the aperture in the end cover has a flexible lip on its periphery to seal against a tube inserted through the end cover.

5. A tube coupling for receiving a tube to be held therein comprising:
    a collet for receiving a tube;
    a body part having an end defining a bore extending through the body part, the bore having an axially tapered portion for cooperating with the arms of the collet extending therein to grip the tube in the collet;
    an end cover having an aperture through which the tube can extend into the collet for enclosing the end in spaced-apart relation to the end and a part of the collet projecting from the end; and
    engaging means for holding said end cover in said spaced-apart relation and for absorbing accidental impact upon said end cover to thereby prevent transmission of the impact to the collet.

6. A tube coupling as claimed in claim 5 wherein said engaging means includes an annular groove at the end of the body part and an inwardly extending annular lip formed on said end cover for engaging said groove, said lip and said groove cooperatingly shaped to permit axially outward disengagement of said lip and said groove, said lip and said groove further cooperatingly shaped to prevent axially inward disengagement thereof.

7. A tube coupling as claimed in claim 6 wherein said lip includes a sloping face on its inward side.

8. A tube coupling as claimed in claim 7 and for use with a tube of predetermined outside diameter wherein the cover is arranged to fit closely around the tube.

9. A tube coupling as claimed in claim 8 wherein the aperture in the end cover is shaped to have a peripheral surface rounded in the axial direction to facilitate passage of a tube through the aperture.

10. A tube coupling as claimed in claim 9 wherein the aperture in the end cover has a flexible lip on its periphery to seal against a tube inserted through the end cover.

* * * * *